(12) United States Patent
Kuerschner et al.

(10) Patent No.: US 7,748,985 B2
(45) Date of Patent: Jul. 6, 2010

(54) CONNECTING DEVICE ARRANGED BETWEEN A STEERING WHEEL AND A PITMAN MODULE OF A MOTOR VEHICLE

(75) Inventors: Sven Kuerschner, Woellstein (DE); Lutz Schneider, Ebernburg (DE)

(73) Assignee: Delphi Technologies, Inc., Troy, MI (US)

( * ) Notice: Subject to any disclaimer, the term of this patent is extended or adjusted under 35 U.S.C. 154(b) by 452 days.

(21) Appl. No.: 11/599,606

(22) Filed: Nov. 14, 2006

(65) Prior Publication Data

US 2007/0123079 A1 May 31, 2007

(30) Foreign Application Priority Data

Nov. 26, 2005 (EP) ................... 05025852

(51) Int. Cl.
*H01R 35/00* (2006.01)
*H01R 35/02* (2006.01)
*H01R 39/00* (2006.01)
H01R 35/04 (2006.01)
H02K 49/00 (2006.01)
H02P 15/00 (2006.01)

(52) U.S. Cl. .................. 439/15; 310/103; 439/13; 439/162; 439/164

(58) Field of Classification Search .............. 310/92, 310/93, 94, 95, 96, 97, 98, 99, 100, 101, 310/102, 103; 439/15, 164, 488, 11, 13, 439/18, 162; *H02K 7/00, 15/00, 49/00, 51/00; H01R 3/00, H01R 31/00, 35/00, 35/02, 35/04, 39/00; H02P 15/00*
See application file for complete search history.

(56) References Cited

U.S. PATENT DOCUMENTS 6,109,942 A * 8/2000 Bannai .................. 439/164
6,494,396 B2 * 12/2002 Sugata .................. 439/164

(Continued)

FOREIGN PATENT DOCUMENTS

WO 00/76877 12/2000

OTHER PUBLICATIONS

European Search Report dated Mar. 15, 2010.

*Primary Examiner*—Quyen Leung
*Assistant Examiner*—Michael Andrews
(74) *Attorney, Agent, or Firm*—Jimmy L. Funke

(57) ABSTRACT

A connecting device arranged between a steering wheel and a pitman module of a motor vehicle encompasses a stator part and a rotor part accommodated therein for enclosing a flexible line comprising several individual electrical conductors, is taken up with its two wide sides via a U-shaped turning section with several windings onto the axially aligned inner wall of the rotor part and spaced apart, and conversely said line is taken up with several additional windings onto the likewise axially aligned outer wall of the stator part, and is held with its two narrow sides between the radially aligned base which in the area of the inner wall is a component of the rotor part and in the area of the outer wall is a component of the stator part, and the radially aligned cover wall of the rotor part. The base and/or the cover wall are designed so that between the inner wall and the outer wall said walls only form sections of a supporting surface for the narrow sides of the line.

8 Claims, 3 Drawing Sheets

U.S. PATENT DOCUMENTS

2001/0036760 A1* 11/2001 Oishi .......................... 439/164
2001/0044229 A1* 11/2001 Bunselmeier et al. ....... 439/164
2003/0008540 A1* 1/2003 Pfeifer et al. ............... 439/164

* cited by examiner

CONNECTING DEVICE ARRANGED BETWEEN A STEERING WHEEL AND A PITMAN MODULE OF A MOTOR VEHICLE

TECHNICAL FIELD

This invention relates to a connecting device arranged between a steering wheel and a pitman module of a motor vehicle, encompassing a stator part and a rotor part accommodated therein for enclosing a flexible line comprising several individual electrical conductors, which is taken up with its two wide sides via a U-shaped turning section with several windings onto the axially aligned inner wall of the rotor part and spaced apart, and conversely said line is taken up with several additional windings onto the likewise axially aligned outer wall of the stator part, and is held with its two narrow sides between the radially aligned base and the radially aligned cover wall.

BACKGROUND OF THE INVENTION

Connecting devices of this type are used especially for transmitting electricity and/or light and/or signals between moveable connecting points which are contained in the steering wheel and are fixed in the area of the steering column. Via the connecting points of the connecting device, for example, an airbag, a steering wheel heater, a switching device, etc., can be supplied with power and/or signals for the purpose of initiating the function. A connecting device is known from practical experience, which consists of a stator part and a rotor part, is accommodated in the stator part, in which a cavity is formed between the stator part and the rotor part for the purpose of accommodating the line which in a reversing loop is conducted into the cavity. This connecting device is disadvantageous in that especially the reversing loop creates interfering noises during operation.

European patent EP 1 183 167 B1 discloses a device for transmitting energy between two ends with at least one flexible line comprised of several conductors, which are accommodated in windings within the annular cavity of a housing surrounding the longitudinal axis of said cavity concentrically, in which one end of the flexible line is fixed at a stator and the other end of the line at a rotor, which can be rotated around the longitudinal axis of the housing opposite the stator part. The flexible line with its two wide sides can be taken up via a U-shaped turning section with at least one winding onto the axially aligned inner wall and spaced apart, conversely said line can be taken up with at least a second winding onto the outer wall of the housing, which also is axially aligned, and with its two narrow sides can be held between the radially aligned base and the radially aligned cover wall of the housing.

The stator consists of a stator base comprised of the outer wall and a first base area, and a stator top comprised of a first cover wall area. The rotor comprises a rotor base with inner wall and a second base area, as well as a second rotor top comprised of a second cover wall area. The cover wall areas and the base areas are so arranged that, within the system of the flexible line at the inner wall said areas only are part of the rotor, and within the system of the flexible line at the inner wall said areas only are part of the stator. This is achieved by the two-part design both of the cover wall areas and the base areas, and thus by the respective two-part design of the stator and the rotor.

SUMMARY OF THE INVENTION

It is the subject matter of the invention to create a connecting device of the above-described type, which ensures a low-noise operation with a relatively small number of individual components.

According to the invention, this problem is solved in that the base and/or the cover wall are designed so that said walls form a supporting surface only in sections for the narrow sides of the line between the inner wall and the outer wall.

Consequently, the frictional area of the base and/or the cover wall is relatively small, as a result of which the operation of the connecting device is low-noise, thus minimizing the scraping noise caused during the winding process.

In particular, a noise development is minimized in which both the base and the cover wall provide a supporting surface for the narrow sides of the line only in some sections. Furthermore, because of the single-part design of the stator and the rotor, this ensures the use of a relatively small number of individual parts.

In terms of design, the base in the area of the inner wall and/or the outer wall comprises a ramp for narrowing the cavity between the base and the cover wall. Because of the narrowing of the height of the cavity by means of the ramp allocated to the base, a rattling noise of the line is reduced when operating the connecting device, while in which outside the ramp there is sufficient free space for moving the line, especially for the U-shaped turning section.

Preferably, the ramp of the base in the area of the inner wall is a component of the rotor. Accordingly, this ramp also turns during a relative rotation of the rotor part towards the stator part, and only a relatively small motion exists between the line and the rotor part, which almost causes no noise.

In order to improve the guiding of the line in the cavity, the cover wall in the area of the inner wall and/or outer wall preferably comprises a ramp for narrowing the cavity between the base and the cover wall. For practical purposes, the shape of the ramps is annular. This prevents the line with its U-shaped turning section to contact the cover wall or the base.

In order to prevent a jamming or a noise caused by a scraping of the line during the winding process onto the inner wall or the outer wall, according to an improvement the ramps are provided with a winding incline for the line. Preferably the ramps are provided with radii at their circumferential edges towards the cavity. The radii facilitate the line running onto the respective ramp.

It is understood that the characteristic features referred to above and to be explained in the following can be used not only in the respective quoted combination, but also in other combinations. The framework of the invention is defined only by the claims.

BRIEF DESCRIPTION OF THE DRAWINGS

In the following, the invention is explained in detail by means of an embodiment with reference to the related drawings. Of the drawings.

DESCRIPTION OF THE PREFERRED EMBODIMENTS

Figure 1:
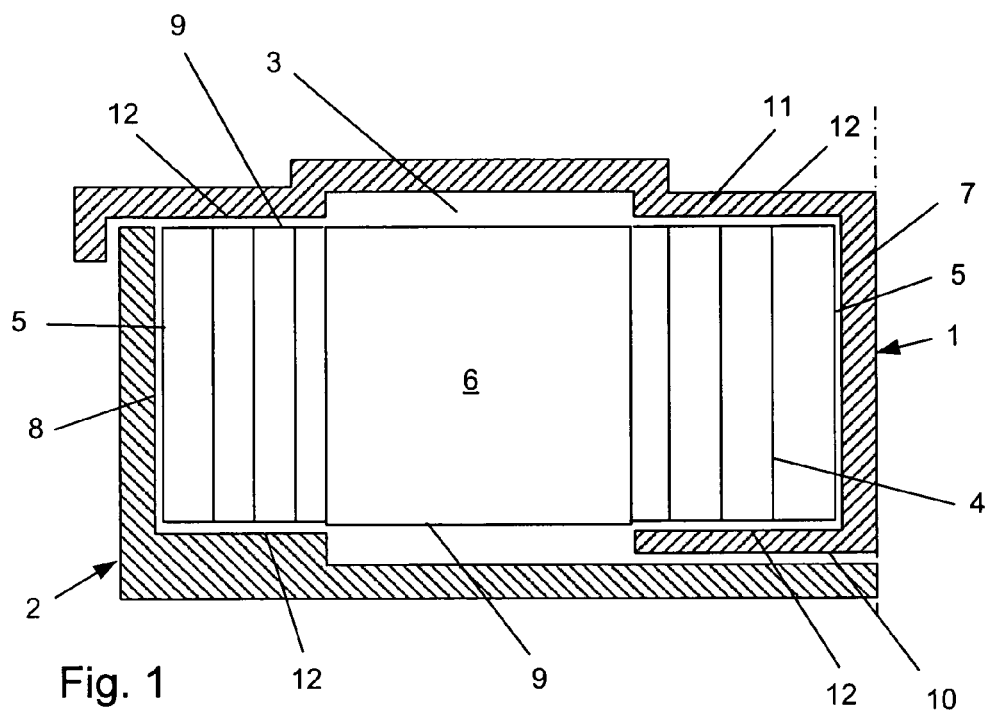
FIG. 1 shows a area of a schematic presentation of the connecting device according to the invention.

The connecting device essentially embraces a rotor part 1 accommodated in a stator part 2. Between the rotor part 1 and the stator part 2, an annular cavity 3 accommodating a flexible line 4, which embraces several individual electrical conductors, is taken up with its two wide sides 5 via a U-shaped turning section 6 with several windings onto the axially aligned inner wall 7 of the rotor part 1 and spaced apart, and conversely said line is taken up with several additional windings onto the likewise axially aligned outer wall 8 of the stator part 2, and is held with its two narrow sides 9 between the radially aligned base 10 and the radially aligned cover wall 11. The cover wall 11 and the base 10 in the area of the inner wall 7 are an components of the rotor part 1.

Figure 2:
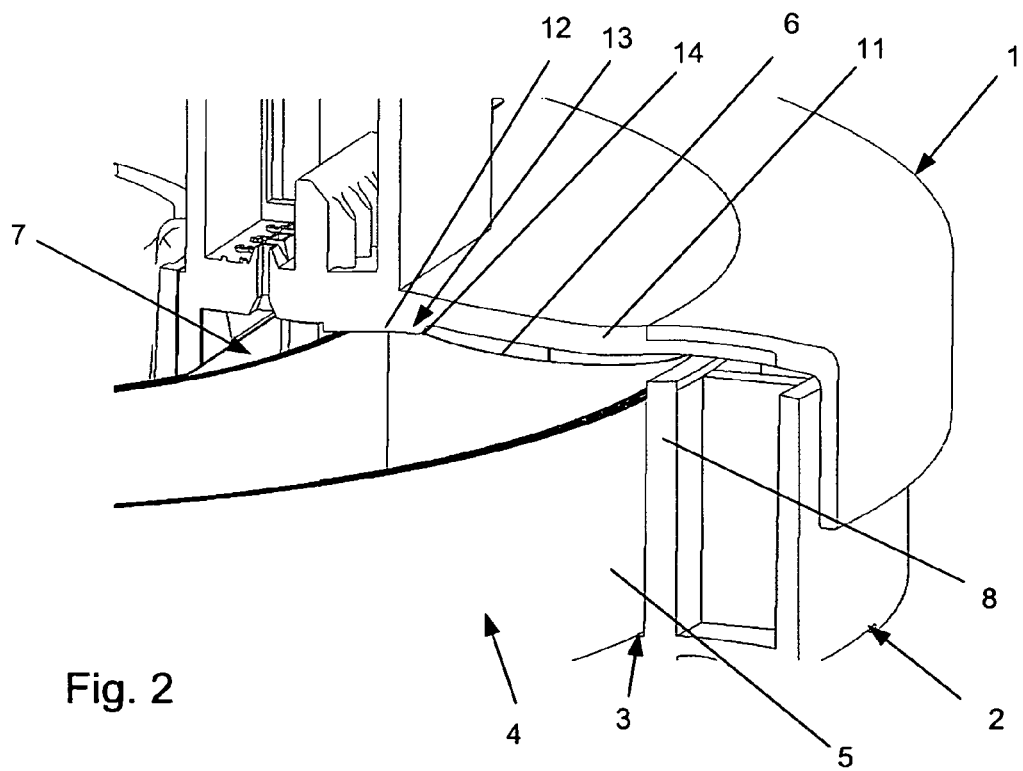
FIG. 2 shows a area of a perspective partial presentation of the connecting device, as shown in FIG. 1.
Figure 3:
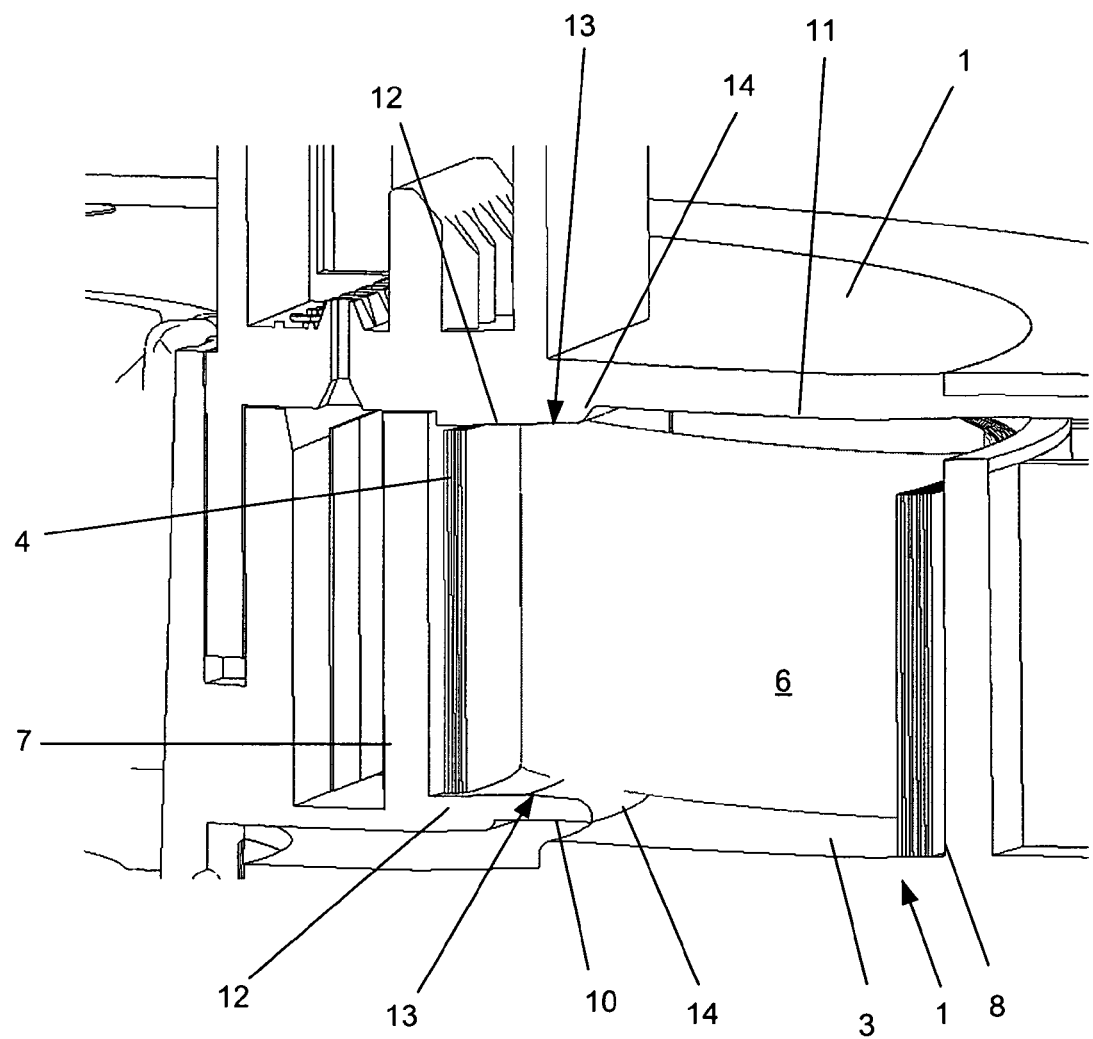
FIG. 3 shows an enlarged perspective partial presentation of the connecting device according to FIG. 2.
Figure 4:
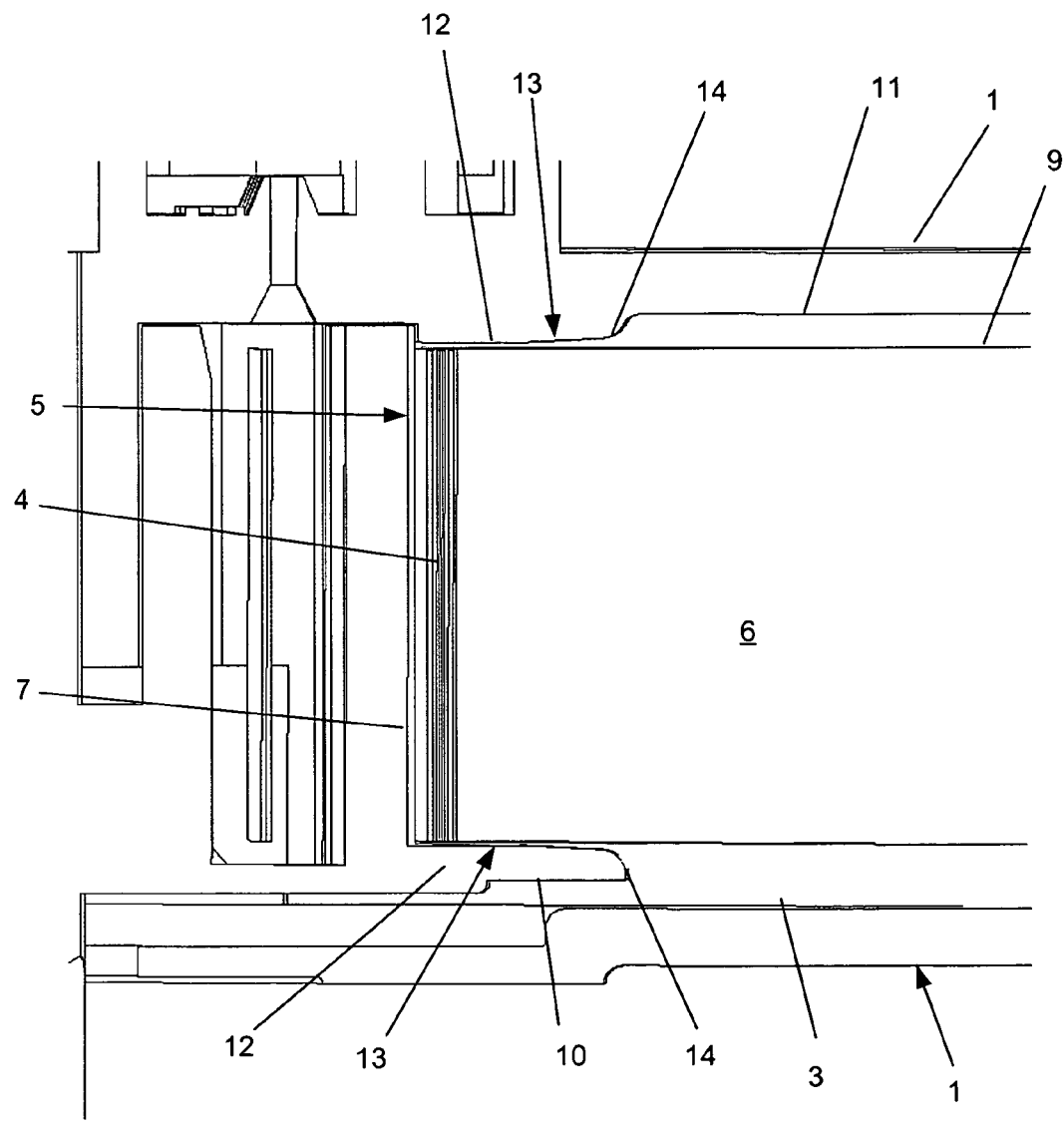
FIG. 4 shows a area of an enlarged presentation of the connecting device, as shown in FIG. 3.

According to FIG. 1, annular ramps 12 are allocated to the base 10 and the cover wall 11 both in the area of the inner wall 7 and the outer wall 8. According to FIGS. 2 to 4, the ramps 12 are located only in the area of the inner wall 7 at the base 10 and the cover wall 11, in which the ramps 12 of the base 10 in the area of the inner wall 7, as well as the ramp 12 of the cover wall 11, are components of the rotor part 1. The ramps 12 provide supporting surfaces for the narrow sides 9 of the line 4 are provided only in some sections, and the U-shaped turning section 6 neither rests on the base 10 nor at the cover wall 11.

The ramps 12 each comprise a winding incline 13 for the line 4 to the allocated inner wall 7 and/or outer wall 8, and comprise radii at the circumferential edges 14 in the direction of the cavity.

The invention claimed is:

1. A connecting device for arrangement between a steering wheel and a steering column module of a motor vehicle, said device comprising:
a stator part and a rotor part received therein for surrounding a flexible electric line, containing at least one conductor, the end of which is in each case connected with the rotor part, the flexible line with its two broad sides through a U-shaped reversing section with at least one winding wound onto an axially directed inner wall of the rotor part as well as spaced therefrom and in reverse, with at least one further winding wound onto the also axially directed outer wall of the stator part and with its narrow sides is held between the radially directed base wall, which in the region of the inner wall is part of the rotor part and in the region of the outer wall is part of the stator part, and the radially directed cover wall of the rotor part, wherein the base wall and the cover wall of the rotor part is constructed in such a way that between the inner wall of the rotor part and the outer wall of the stator part they form in sections only a support surface for the narrow sides of the line, wherein both narrow sides of the line windings on the inner wall and one of the narrow sides of the line windings on the outer wall are axially supported by the rotor part, and wherein the cover wall of the rotor part in the region of the inner wall has a ramp for narrowing the hollow space between the base wall and the cover wall of the rotor part.

2. A connecting device as defined in claim 1, wherein the base wall in the area of the inner wall and/or the outer wall comprises a ramp for narrowing the cavity between the base wall and the cover wall.

3. A connecting device as defined in claim 1, wherein the ramp of the base wall in the area of the inner wall is a component of the rotor part.

4. A connecting device as defined in claim 1, wherein the cover wall in the area of the outer wall comprises a ramp for narrowing the cavity between the base wall and the cover wall.

5. A connecting device as defined in claim 1, wherein the shape of the ramps is annular.

6. A connecting device as defined in claim 1, wherein the shape of ramps comprise a guide slope for the line.

7. A connecting device as defined in claim 1, wherein the shape of ramps are provided with radii at their circumferential edges directed towards the cavity.

8. A device for transmitting signals between an automotive steering wheel and steering column, said device comprising:
a stator;
a rotor disposed concentrically with said stator for at least limited relative rotation with respect thereto about an axis of rotation, said stator defining an axially aligned outer wall and a first radially aligned base wall portion, said rotor defining an axially aligned inner wall, a radially aligned cover wall and a second radially aligned base wall portion, said inner, outer and cover walls and first and second base wall portions collectively forming a substantially closed annular cavity;
an elongated, flexible line disposed within said closed annular cavity, said line including a plurality of individual conductors, said line having a first end operatively connected to said stator, a second end operatively connected to said rotor, two opposed axially extending wide sides, two opposed radially extending narrow sides, and at least one U-shaped reversing section disposed intermediate said first and second ends,
wherein the first end of said line is wound at least once onto the outer wall and axially spaced from adjacent portions of said first base wall portion and rotor cover wall,
wherein the second end of said line is wound at least once onto the inner wall and axially spaced from other adjacent portions of both said second base wall portion and said rotor cover wall, and
wherein both narrow sides of the line windings on the inner wall and one of the narrow sides of the line windings on the outer wall are axially supported by the rotor;
a first tapered annular ramp carried with a portion of said cover wall adjacent said outer wall, said first tapered ramp extending inwardly within said annular cavity to abut one narrow edge of the first end winding of said line;
a second tapered annular ramp carried with a portion of said first base wall portion adjacent said outer wall, said second tapered ramp extending inwardly within said annular cavity to abut a second narrow edge of the first end winding of said line;
a third tapered annular ramp carried with a portion of said cover wall adjacent said inner wall, said third tapered ramp extending inwardly within said annular cavity to abut one narrow edge of the second end winding of said line; and
a fourth tapered annular ramp carried with a portion of said second base wall portion adjacent said inner wall, said fourth tapered ramp extending inwardly within said annular cavity to abut a second narrow edge of the second end winding of said line, wherein the first and second tapered annular ramps cooperate to axially position the first end winding of said line by contacting only respective adjacent narrow sides of the line, and the third and fourth tapered annular ramps cooperate to axially position the second end winding of said line by contacting only respective adjacent narrow sides of the line.

\* \* \* \* \*